United States Patent
Ying

(10) Patent No.: US 6,298,286 B1
(45) Date of Patent: Oct. 2, 2001

(54) METHOD OF PREVENTING POTENTIALLY HAZARDOUSLY MISLEADING ATTITUDE DATA

(75) Inventor: Sidney S. Ying, Indialantic, FL (US)

(73) Assignee: Rockwell Collins, Cedar Rapids, IA (US)

(*) Notice: Subject to any disclaimer, the term of this patent is extended or adjusted under 35 U.S.C. 154(b) by 0 days.

(21) Appl. No.: 09/466,700

(22) Filed: Dec. 17, 1999

(51) Int. Cl.[7] .................................................. B64D 47/02
(52) U.S. Cl. ............................ 701/4; 701/1; 340/967; 340/974; 340/977; 244/1 R
(58) Field of Search ..................... 701/4, 1, 8, 9, 701/11, 12, 14; 244/1 R, 180, 189; 340/967, 973, 974, 969, 977, 978, 970

(56) References Cited

U.S. PATENT DOCUMENTS

| | | | |
|---|---|---|---|
| 5,050,087 | * 9/1991 | Walrath et al. | 701/4 |
| 5,169,090 | * 12/1992 | Wright et al. | 244/17.13 |
| 5,406,489 | * 4/1995 | Timothy et al. | 701/4 |
| 5,493,497 | * 2/1996 | Buus | 701/4 |
| 5,809,457 | * 9/1998 | Yee et al. | 701/220 |
| 5,870,486 | * 2/1999 | Choate et al. | 382/103 |
| 5,894,323 | * 4/1999 | Kain et al. | 348/116 |
| 5,968,100 | * 10/1999 | Kayano et al. | 701/1 |
| 6,020,832 | * 2/2000 | Jensen | 340/970 |
| 6,088,653 | * 7/2000 | Sheikh et al. | 701/214 |
| 6,177,888 | * 1/2001 | Cabot et al. | 340/968 |
| 6,181,989 | * 1/2001 | Gwozdecki | 701/4 |

* cited by examiner

Primary Examiner—William A. Cuchlinski, Jr.
Assistant Examiner—Olga Hernandez
(74) Attorney, Agent, or Firm—Nathan O. Jensen; Kyle Eppele

(57) ABSTRACT

The invention discloses a method of preventing potentially hazardously misleading attitude data. The method includes deriving a value for a leveling parameter from inertial and velocity data, monitoring the leveling parameter for a characteristic indicative of producing potentially hazardously misleading attitude data, and disregarding at least some air data if the characteristic is detected. The computer readable medium contains instructions to cause an attitude heading computer to perform the steps of (1) deriving a leveling parameter from velocity data and inertial data; (2) monitoring the leveling parameter for a characteristic indicative of producing hazardously misleading attitude data; and (3) not accounting for at least some velocity data in leveling algorithms if the characteristic is detected. The invention also includes a second embodiment of a method of preventing potentially hazardously misleading attitude data. The second embodiment includes deriving both pitch and roll leveling rates from velocity data and inertial data. These leveling rates are monitored for a characteristic indicative of producing hazardously misleading attitude data. At least some velocity data is disregarded if the characteristic is detected. The flight control system includes a plurality of attitude/heading computers. A plurality of inertial data sensors are input into the attitude heading computers. A leveling aiding source outputs velocity data as an input into each of the attitude/heading computers.

33 Claims, 7 Drawing Sheets

——— Roll Error [deg]

——— del_roll_filt [deg/min]

——— ADM_valid

---- Roll Error (unmonitored) [deg]

—·— Heading [deg]

METHOD OF PREVENTING POTENTIALLY HAZARDOUSLY MISLEADING ATTITUDE DATA

BACKGROUND OF THE INVENTION

A. Field of the Invention

The present invention relates to a method of preventing velocity data from causing an occurrence of potentially hazardously misleading attitude data. The velocity data may be used to aid in attitude leveling algorithms, for example, in an attitude/heading computer.

B. Problems in the Art

Airplanes use an attitude/heading computer (AHC) to provide the attitude/heading information of the plane. The AHC utilizes velocity information received from an external leveling aiding source to aid in its attitude leveling algorithms. The external leveling aiding source can include, for example, an air data computer (ADC), a GPS receiver, and others, such as are known in the art. The velocity information that an AHC receives for attitude leveling aiding can include, for example, true air speed, true altitude rate, indicated air speed, indicated altitude rate, ground speed, etc.

The AHC controls the attitude leveling function of the automatic flight control system in airplanes. The AHC also controls display of attitude information on primary flight displays within the cockpit. Airplanes will often have dual or even triple AHCs. In order to comply with Federal Aviation Administration (FAA) regulations, airplanes can be equipped with one ADC (or other leveling aiding source) for each AHC.

FAA Advisory Circular AC 25-11 classifies display of attitude in the cockpit as a critical function with the following specific guidelines concerning potential effects: (1) Total loss of all attitude display in the cockpit is classified as catastrophic and must be shown to have a probability of less than $1.0 \times 10^{-9}$/hour; (2) Loss of attitude display on both primary displays is major and it must be shown to have a probability of less than $1.0 \times 10^{-5}$/hour; (3) Hazardously misleading display of pitch or roll simultaneously on both primary flight displays is catastrophic and must be shown to have a probability of less than $1.0 \times 10^{-9}$/hour; and (4) Hazardously misleading display of pitch or roll on a single primary flight display is major and must be shown to have a probability of less than $1.0 \times 10^{-5}$/hour. The European Joint Aviation Authorities (JAA) have similar guidelines, with the exception that hazardously misleading display of pitch or roll on a single primary flight display is considered hazardous and must be shown to have a probability of less than $1.0 \times 10^{-7}$/hour.

In order to satisfy these regulations, a single ADC has previously served as an input for only one AHC. Primary flight displays were provided with pitch and roll comparators that compared pitch and roll data from each of two AHCs that provided primary display of pitch and roll data. The comparator warnings were displayed when pitch or roll disagreed by more than four degrees for longer than one second. Therefore, in order for the comparators to be "fooled," both AHC units had to exhibit failure modes that provided the same misleading pitch or roll information without warning. In installations where each AHC received data from a different ADC, both ADCs had to fail in an identical manner simultaneously to avoid comparator detection of a hazardous effect on pitch or roll data. The probability of a random hardware failure causing this in both ADC units is negligible.

While the method of providing a different ADC for each AHC satisfies safety regulations, this implementation also increases the overall cost of the airplane. In addition, providing separate ADCs for each AHC increases the amount of weight within the airplane. A method that could satisfy FAA and JAA regulations while eliminating the need for multiple ADCs would reduce the cost of an airplane by saving the expense of multiple ADCs. It would also reduce the expense of operating an airplane by eliminating the weight of the multiple ADCs. In addition, it would save the electrical energy that is currently required to power the multiple ADCs. There is a need in the art for a method and apparatus that complies with FAA regulations while allowing an ADC to be input into multiple AHCs.

Therefore, it is a primary object of the present invention to provide a method of preventing potentially hazardously misleading attitude data that solves problems and deficiencies in the art.

It is another object of the present invention to provide a method of preventing potentially hazardously misleading attitude data whereby a single ADC can be input into multiple AHCs while still satisfying FAA safety requirements.

It is a further object of the present invention to reduce the cost of airplanes, particularly by eliminating the extra expense associated with using a plurality of ADCs.

It is a further object of the present invention to reduce weight within an airplane.

It is a further object of the present invention to monitor leveling parameters to identify the possibility of hazardously misleading attitude data.

It is a further object of the present invention to provide a method which prevents an AHC from displaying hazardously misleading attitude information on a flight display.

Yet another object of the present invention is to provide a method which prevents an AHC from outputting hazardously misleading attitude data to an automatic flight control system.

It is a further object of the present invention that the threshold for the leveling parameters be of sufficient magnitude such that the occurrence of false detections is minimized when the air data is good.

These, as well as other objects and features of the present invention, will be apparent from the following detailed description and claims in conjunction with the accompanying drawings.

SUMMARY OF THE INVENTION

The present invention discloses a method of preventing potentially hazardously misleading attitude data. The method includes deriving a value for a leveling parameter from inertial and velocity data, monitoring the leveling parameter for a characteristic indicative of producing potentially hazardously misleading attitude data, and disregarding at least some air data if the characteristic is detected. The characteristic can be detected by comparing value of the leveling parameter to a threshold value and determining if the leveling parameter exceeds the threshold.

The present invention can also include a computer readable medium. The computer readable medium contains instructions to cause an attitude heading computer to perform the steps of (1) deriving a leveling parameter from velocity data and inertial data; (2) monitoring the leveling parameter for a characteristic indicative of producing hazardously misleading attitude data; and (3) not accounting for at least some velocity data in leveling algorithms if the characteristic is detected.

The present invention can also include a second embodiment of a method of preventing potentially hazardously misleading attitude data. The second embodiment includes deriving both pitch and roll leveling rates from velocity data and inertial data. These leveling rates are monitored for a characteristic indicative of producing hazardously misleading attitude data. At least some velocity data is disregarded if the characteristic is detected.

The present invention may also include a flight control system. The flight control system includes a plurality of attitude/heading computers. A plurality of inertial data sensors are input into the attitude heading computers. A leveling aiding source outputs velocity data as an input into each of the attitude/heading computers.

DETAILED DESCRIPTION AN EXEMPLARY EMBODIMENT

Figure 1:
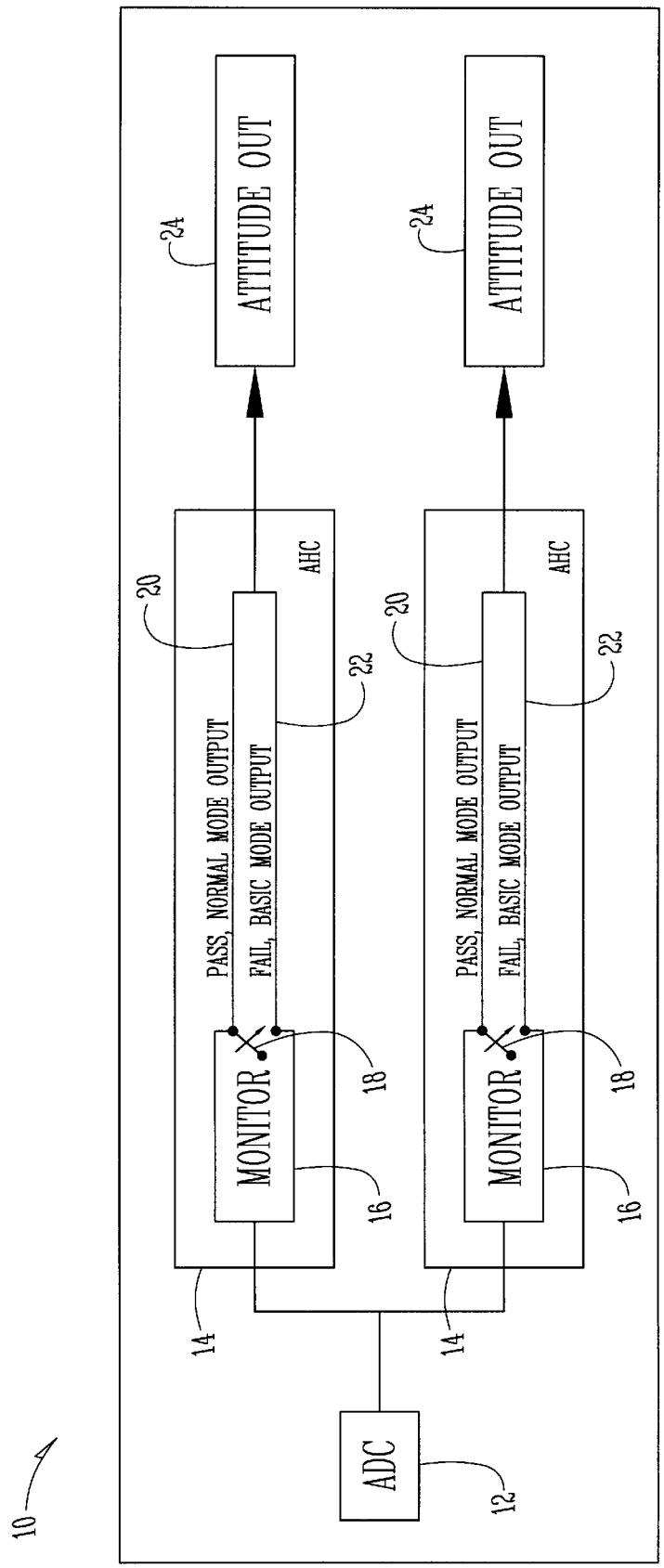
FIG. 1 is a block diagram showing a single air data computer input into two attitude/heading computers.

FIG. 1 shows a block diagram of components of an airplane leveling system 10 which utilizes a method of preventing potentially hazardously misleading attitude data according to an embodiment of the present invention. The leveling system 10 includes a single air data computer (ADC) 12. An example of ADC 12 is an ADC-3000 available from the Rockwell Collins division of Rockwell International Corporation, having a corporate headquarters in Milwaukee, Wis. Air data from ADC 12 can include true air speed (TAS) and altitude rate data or vertical speed (VS), as well as other information. ADC 12 is a leveling aiding source. A leveling aiding source provides velocity data of the airplane. Other leveling aiding sources could be used, for example, a GPS receiver. For a GPS receiver, the speed of the plane relative to the ground (ground speed) and the vertical speed of the plane can be calculated. The air speed and altitude rate information provided by ADC 12 are acquired by conventional methods in the art, such as through the use of a pitot/static tube and temperature probe. The pitot/static tube and temperature probe are input into ADC 12. ADC 12 calculates TAS and VS based upon the outputs of the pitot/static tube and temperature probe. If only a pitot/static tube is input into ADC 12, ADC 12 calculates indicated air speed and pressure altitude of the airplane. ADC 12 is connected to two attitude/heading computers (AHCs) 14. ADC 12 outputs the air data information to AHCs 14. An example of AHC 14 is an AHC-3000 available from the Rockwell Collins division of Rockwell International Corporation.

Within each AHC 14, there is a monitor 16. Monitor 16 checks the attitude leveling effect caused by the ADC 12 inputs to ensure that erroneous TAS or VS data will not cause AHC 14 to output hazardously misleading information (HMI) relating to attitude. This monitoring ensures that all TAS or VS failure modes, even those that cannot be predicted, are detected if their effect on the attitude leveling can lead to the output of hazardously misleading attitude data. Monitors 16 operate to control switches 18. While monitor 16 could be implemented in hardware, in most situations it will be implemented in software. The monitor program could be written in many programming languages, for example, Ada.

Depending on the values of the thresholds and the values of the leveling parameters, switch 18 will assign either a pass 20 or fail 22 to the air data leveling effect. Monitor 16 compares a leveling parameter to its threshold. If the parameter exceeds its threshold, a fail 22 will be assigned to the air data leveling effect. The value of the threshold is set such that if the leveling parameter exceeds its threshold then it is likely that AHC 14 would output hazardously misleading attitude information. If a fail 22 is assigned to the leveling effect, AHC 14 will revert to a basic mode, wherein it does not use the air data (or disregards the leveling aiding source) in its leveling algorithms. The basic mode of leveling is known in the art. If the leveling parameters are less than or equal to a predefined threshold, monitor 16 will do nothing and the switch will remain on the "pass" line 20, wherein AHCs 14 will continue to operate in a normal mode, using air data in their leveling algorithms. Normal mode leveling algorithms are known.

AHCs 14 interface with the automatic flight control system as well as with the primary flight displays. Failures of an AHC 14 can contribute to the following automatic flight control system functional hazards.

| | |
|---|---|
| • Multi-Axis Hardover - with protection | Hazardous |
| • Multi-Axis Hardover - with cutouts failed | Hazardous |
| • Multi-Axis Hardover - with torque limits failed | Catastrophic |
| • Single Axis Hardover - with protection | Major |
| • Single Axis Hardover - with cutouts failed | Hazardous |
| • Single Axis Hardover - with torque limits failed | Catastrophic |
| • Single Axis Oscillatory - with torque limits | Major |
| • Single Axis Oscillatory - with torque limits failed | Catastrophic |
| • Roll Slowover with excessive roll attitude disengage inhibited | Hazardous |
| • Pitch Slowover in combination with Loss of Stall Warning | Hazardous |

Failure of the air speed and altitude rate inputs to an AHC 14 cannot cause incorrect output of pitch or roll data that can contribute to an automatic flight control hardover condition, because the authority of the leveling effect due to air speed and altitude rate is limited to approximately 5.1 degrees/ minute in AHC 14. However, failure in the air speed and the altitude rate inputs can lead to the display of hazardously misleading attitude information and to automatic flight control system slow-overs. To prevent these mishaps from occurring, monitor 16 monitors leveling parameters, and causes the airplane to not use the air data in its leveling algorithms if the parameter exceeds its threshold.

A To understand the attitude errors that can result from either the failure of ADC 12 (which may be attributable to a hardware failure), or erroneous air data input that may be attributable to a faulty pitot/static tube or temperature probe, it is necessary to understand how AHC 14 functions in controlling the leveling mechanization of the airplane. The attitude information provided by AHC 14 is defined as the Euler angular transformation between the aircraft body axes and the local level reference. The Euler angular transformation is known in the art. When AHC 14 powers up, AHC 14 uses acceleration sensors to detect the earth's gravity vector and align it to the local level reference in a process known as initialization. With this initial local level reference, AHC 14 uses the sensed acceleration along the body axes to establish the initial attitude.

After initialization, AHC 14 uses angular rate sensors to detect movement of the aircraft body axes. As the aircraft moves across the earth's surface, the initially computed local level reference is adjusted so it remains level with the earth's surface. If AHC 14 does not make corrections for the changing reference, small attitude errors will be introduced. Failure to "rotate" the reference, coupled with rate sensor bias errors, results in drift in the attitude output. To correct for the attitude drift, AHC 14 continuously uses acceleration sensors to detect the earth's gravity vector and compute an alignment error. AHC 14 uses this alignment error to "level" the computed local level reference. In addition, under suitable conditions, AHC 14 also uses the alignment error to estimate the attitude rate gyro biases. The resulting adjustment rates of the computed local level reference are commonly referred to as (platform) leveling rates or erection rates. The computation of local reference leveling rates is known in the art.

As mentioned, AHC 14 continuously uses accelerations measured by acceleration sensors to update the local level reference. However, the acceleration sensed by AHC 14 not only consists of the earth's gravity, but also includes accelerations induced by aircraft maneuvers. To establish the true gravity vector, it is necessary to eliminate the maneuver-induced acceleration from the sensed acceleration. During normal mode operation, the air speed and altitude rate data from ADC 12 are used to cancel out maneuver-induced accelerations so that the earth's gravity-induced acceleration may be extracted from the AHC 14 acceleration measurement and used to update the local level reference. In the case of erroneous air data input that causes the local level reference to be computed incorrectly, it is called mis-leveling or mis-erection.

For ease of understanding, only two basic types of maneuver-induced accelerations are discussed below. Other maneuver-induced accelerations are combinations of these two types. The first maneuver-induced acceleration is the aircraft acceleration due to along-heading acceleration or deceleration during straight flight. The second is the aircraft acceleration induced due to cross-heading acceleration during coordinated turns.

To correct for the false vertical due to along-heading accelerations, a derivative of the air speed signal is taken to obtain a representation of aircraft acceleration. The difference between this reference acceleration and the measured acceleration in the level axes system is interpreted as the gravity component being sensed in the level axes system in the along-heading axis. Since there should be no gravity component along any level axes, this along-heading acceleration difference represents alignment error of the AHC 14 local level reference, and proportionate leveling adjustments, as are known in the art, are applied to align the local level reference.

During a coordinated turn, the measured resultant acceleration vector is misplaced from vertical by approximately the bank angle (Ø). True air speed (TAS) and turn rate are used to compute a reference bank angle, $Ø_{13}$ ref, where $Ø_{13}\text{ref}=\tan^{-1}((\text{TAS}\times\text{turn rate})/g)$. The difference between the measured cross-heading acceleration, $g\times\tan(Ø)$, and the reference cross-heading acceleration, $g\times\tan(Ø_{13}$ ref), provides a measure of mis-erection of the AHC 14 local level reference. The proportionate leveling adjustments are then applied to level the mis-erected AHC 14 level reference axes.

The altitude rate (or vertical speed) information received from the ADC 12 is used to compute the estimated angle of attack in the AHC 14 normal mode leveling mechanization. Compared with the air speed, altitude rate has very minor effect on the leveling loop. The altitude rate has its greatest effect on the leveling mechanization when an air craft is in a high rate maneuver. There is a negligible effect from the altitude rate input on the leveling loop during straight and level flight conditions.

As a safety precaution, attitude leveling authority with ADC 12 aiding is generally limited to approximately 4.6 degrees/minute. During the AHC 14 leveling process, the attitude rate gyro biases are also estimated. These gyro biases are then subtracted from the gyro output. The attitude rate gyro bias estimation consists of an integral over time and has a much slower response to the level axes alignment errors. The maximum attitude change caused by the gyro bias estimation is generally limited to 0.5 degrees over a one minute interval. Therefore, the maximum attitude change resulting from the air data leveling is generally limited to approximately 5.1 degrees/minute.

The following are air data computer failure modes that could affect the output of True Airspeed (TAS) data:
(1) Loss of TAS data on the ADC's output bus.
(2) Detected failure that causes the air data computer to set the TAS status bit to fail warn (FW) or no computed data (NCD).
(3) Undetected failure that causes offset in TAS output.
(4) Undetected failure that causes TAS output to be stuck at a constant value.
(5) Undetected failure that causes random incorrect TAS output.
(6) Undetected failure that causes ramp up or down of TAS output.
(7) Undetected failure that causes saw tooth ramp up or down of TAS output.

The following are air data computer failure modes that could affect the output of Vertical Speed (VS) data:
(1) Loss of VS data on the ADC's output bus.
(2) Detected failure that causes the ADC to set the VS status bit to fail warn (FW) or no computed data (NCD).
(3) Undetected failure that causes offset in VS output.
(4) Undetected failure that causes VS output to be stuck at a constant value.
(5) Undetected failure that causes random incorrect VS output.

Air Data Failure Mode/Effect Analysis

The aircraft leveling effects of the above mentioned possible air data failure modes are described in this section.

A. Loss of TAS or VS Output on the ADC's Output Bus

Failures that result in loss of the True Airspeed (TAS) or Vertical Speed (VS) output on the ADC 12 bus connected to the AHC 14 will cause the AHC 14 to revert to basic mode operation. In basic mode, the AHC 14 does not use air data (or other velocity data) in the leveling algorithms. When the AHC 14 operates in this mode, it is subject to the same types of errors during maneuvers that a vertical gyro is subject to.

B. TAS or VS Status Bit Set to NCD or FW

Failures that cause ADC 12 to set the status bits of the TAS or VS label to no computed data or fail warn will cause AHC 14 to operate in basic mode.

C. TAS Output Exhibits an Offset

The effect of a TAS offset on the leveling algorithm that subtracts the effect of longitudinal acceleration during straight flight is minimal. Since AHC 14 uses the differential of true airspeed to determine the longitudinal acceleration contribution to sensed acceleration, an offset will not cause incorrect attitude data while the true airspeed is being used.

A major effect of an offset will be on the logic for determining when air data parameters are used in the leveling algorithm. AHC 14 usually operates in normal mode when TAS is between 65 and 600 knots, and operates in basic mode outside of this. The range checking is performed to ensure that air data is stable when AHC 14 uses the air data. If the offset is positive, the AHC 14 will operate in normal mode earlier than intended at low airspeeds, and AHC 14 will operate in basic mode earlier than intended at high airspeeds. If the offset is negative, AHC 14 will operate in basic mode longer than intended at low airspeeds, and will operate in normal mode longer than intended at high airspeeds. Aircraft on which a configuration of multiple AHCs 14 and a single ADC 12 will normally be used usually do not operate at true airspeeds less than or equal to 65 knots long enough for inaccurate true airspeed information to cause hazardously misleading attitude information. These aircraft usually do not operate at true airspeeds of 600 knots or greater.

As previously described, during a coordinated turn the TAS is used to compute the reference bank angle. TAS offset will result in an erroneous reference bank angle. The magnitude of the bank angle error is $\emptyset\_ref_{13}$ error=$\tan^{-1}((TAS \times turn\ rate)/g) - \tan^{-1}(((TAS+offset) \times turn\ rate)/g)$. The AHC 14 will be gradually mis-erected to the erroneous bank reference. Furthermore, as the vehicle turns, the bank error will transfer to the pitch error gradually and vice versa. If the turn lasts long enough, the roll and pitch error will reach their stable limits, respectively.

D. TAS Output Stuck at Constant Value

A failure that causes the TAS output to be stuck at a constant value will affect both leveling algorithms. If TAS is stuck at a value that is less than or equal to 65 knots or to a value that is greater than or equal to 600 knots, air data parameters will not be used in the leveling algorithm, and the AHC 14 will constantly operate in basic mode.

If TAS is stuck at a value within the 65–600 knot range, the AHC 14 will continue to operate in normal mode, but will mis-level during periods of aircraft along-heading acceleration/deceleration. This mis-leveling effect is the opposite of the effect when the aircraft is in straight/constant speed flight and the TAS exhibits an erroneous ramp pattern.

During a coordinated turn, if TAS is stuck at a value within the 65–600 knot range but different from the actual TAS, the AHC 14 will continue to operate in normal mode with a mis-leveling effect. This mis-leveling effect is the same as the effect caused when the TAS output exhibits an offset with the offset value equal to the difference between the actual TAS and stuck value.

E. TAS Output is Randomly Incorrect

The received TAS input can be filtered with a 2 second low pass filter. In addition, the computed local level reference is treated as a long term reference in the AHC 14 attitude computation. Therefore, the randomly erratic TAS output will usually have little effect in the attitude solution.

F. TAS Output Ramps

A failure that causes the TAS output to ramp up or down within the valid TAS range will effect both leveling algorithms. The magnitude of the effect is dependent on the rate of the ramp. Once the TAS value ramps above or below the valid TAS range, the AHC 14 will operate in basic mode.

During straight flight, the TAS ramp will be perceived as an aircraft along-heading acceleration or deceleration. For the length of time the TAS value stays within the valid TAS range, the AHC 14 will calculate an incorrect gravity vector (if the aircraft is actually at a constant speed), causing a mis-erection. Because of the limited leveling authority, this will result at worst in a 5.1 degrees/minute error in pitch.

During a coordinated turn, the TAS ramp error will induce errors in both along-heading acceleration and cross-heading acceleration. Therefore, the resulting attitude errors are a combination of the mis-erection effect on both level reference axes. Because of the limited leveling authority, this will result at worst in a 5.1 degrees/minute error in pitch or roll. Furthermore, as is understood in the art, the roll error and pitch errors will transfer between each other during the turn.

G. TAS Output Exhibits a Saw-Tooth Ramp Output

The failure mode postulated here is similar to the TAS ramp failure mode. The effect on the along-heading acceleration correction is the same as for the TAS ramp, with a worst case effect of an approximately 5.1 degree/minute pitch error. If the saw-tooth ramp output always falls within the valid TAS range, the mis-leveling effect can last indefinitely. On the contrary, the effect of a ramp TAS lasts only one sweep over the valid TAS range.

Similarly, during a coordinated turn, the effect of an erroneous saw-tooth ramp TAS is the same as that of a ramp TAS. The same comment regarding the leveling period applies for the erroneous saw-tooth TAS during a coordinated turn.

H. General Discussion of Altitude Rate Failure Effect

As previously discussed, the altitude rate has negligible effect on the leveling loop during straight/level flight. Therefore, the error in altitude rate causes an attitude error only during maneuvers. To have a non-negligible mis-leveling effect, the altitude rate error must be accompanied by sufficiently high body roll rate or body pitch rate.

Figure 2:
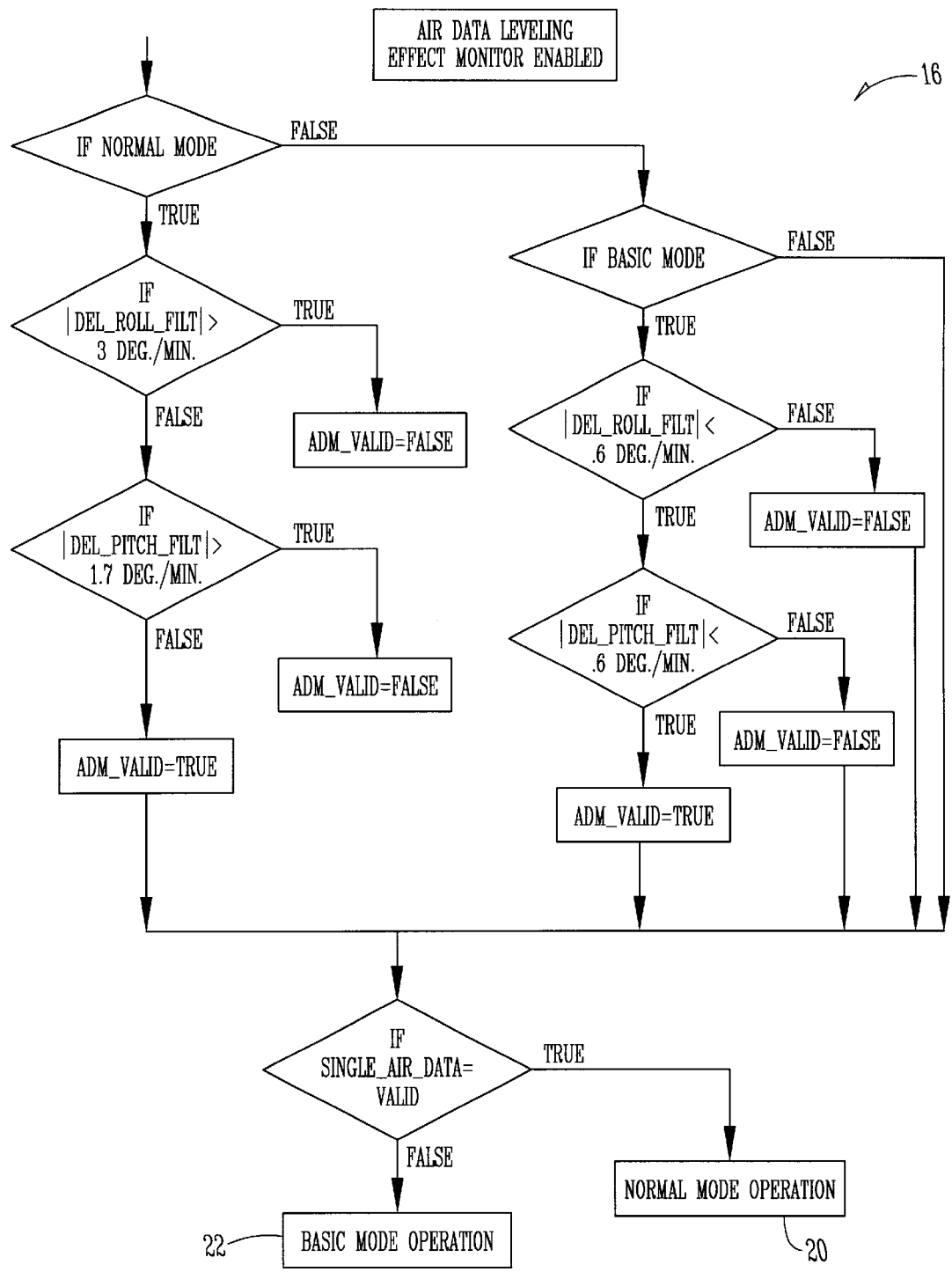
FIG. 2 is a flowchart illustrating a method of preventing potentially hazardously misleading attitude data according to an embodiment of the present invention.

Having seen some of the effects from erroneous air data input, the solution provided by the present invention will now be described. In order to prevent the mishaps from causing hazardously misleading attitude data, the air data leveling effect monitor 16 (also referred to as a method of preventing potentially hazardously misleading attitude data) of FIG. 2 is implemented. In the described embodiment, monitor 16 is a computer program, although it could be implemented in hardware.

A direct indication of erroneous air data input is the unreasonableness of the leveling rates. Therefore, the monitored (or leveling) parameters are chosen as functions of the leveling terms. The monitoring parameters should also provide a good indication of the resulting attitude deviation such that the occurrence of an attitude HMI (Hazardously Misleading Information) can be related to the values of the threshold for the leveling parameters. The roll leveling rate and pitch leveling rate are two leveling parameters that give a good indication of the possibility of an attitude HMI in those cases where these leveling parameters exceed their thresholds. The roll leveling rate and pitch leveling rate can be determined by methods commonly known in the art.

Existing AHC mechanization provides the leveling terms along the body axes: the longitudinal axis, and the lateral axis. The longitudinal-axis leveling term closely correlates to the pitch attitude change during straight flights. However, during bank turns, the body-axes leveling terms do not have a good correlation with the attitude change. As is understood in the art, these body-axes leveling terms are preferably transformed to the Euler-axes (or local-level axes) based leveling terms to provide effective monitoring of the induced attitude error. Furthermore, to prevent short-term value fluctuations from causing unnecessary alarms, the Euler-axes based leveling terms are filtered with a first-order filter with a time constant of 30 seconds. The resulting two air data leveling parameters (one along the roll-axis and another along the pitch-axis) are referred to as del_roll_filt and del_pitch_filt (FIG. 2). The del_pitch_filt and del_roll_filt are calculated by AHC 14.

Referring again to FIG. 2, the del_pitch_filt and del_roll_filt are input into monitor 16. The initial decision made by monitor 16 is a determination of whether AHC 14 is operating in normal or basic mode. Normal mode uses air data (or other velocity data) in the attitude leveling algorithms. Basic mode does not use air data (or other velocity data) in the leveling algorithms.

Normal mode is the default mode. The leveling algorithms function better when the air data is used. If AHC 14 is operating in normal mode, the next step is to compare the filtered leveling rate along the roll axis to its threshold. In the example in FIG. 2, the computed leveling rate along the roll axis is filtered with a thirty second filter. Of course, other time constants could be used for the filter, or no filter could be applied to the roll leveling rate. Smaller time constant filters could lead to identifying potentially hazardously misleading attitude data when the air data is good.

The threshold for the filtered roll rate will vary depending on the type of airplane, flight conditions, and the flight profile. The threshold is set at a point such that if an erroneous air data input would cause an attitude HMI, then the resulting leveling parameter will exceed the threshold value. The value of the threshold can be such that the threshold will be reached prior to a point where an output of an attitude HMI would result. For the example in FIG. 2, an attitude HMI is defined as 5 degrees error in pitch or roll attitude. Of course, the magnitude of the attitude HMI could be more or less than 5 degrees, depending on the particular type of aircraft, flight conditions, and flight profile.

To provide some safety margin, the threshold values may be set such that if the leveling parameters do not exceed their respective threshold values, the maximum attitude error caused by the erroneous air data leveling effect is less than 4.3 degrees. In this way, there is an error budget of 0.7 degrees before reaching the attitude HMI limit under the worst effect caused by the erroneous air data leveling without monitor detection. The respective thresholds could be set at higher limits wherein detection would not occur unless the HMI attitude limit was reached. The threshold should not be set too low wherein the air data induced leveling rates exceed their respective thresholds when the air data is not in error. In this way, AHC 14 will not unnecessarily revert to basic mode operation.

For the example in FIG. 2, if the magnitude of the filtered leveling rate along the roll-axis, del_roll_filt, is greater than 3 degrees/min, then the ADM_valid flag will be set to false. Setting the ADM_valid flag to false results in monitor 16 "instructing" AHC 14 to revert to a basic mode of operation, wherein air data is not used in the leveling algorithms.

If the magnitude of del_roll_filt is less than 3 degrees/min, the next step is to compare the filtered leveling rate along the pitch axis, del_pitch_filt, to its respective threshold. The threshold for the filtered pitch rate is set taking into account the same considerations that are used in setting the threshold hold for the roll rate. In FIG. 2, the threshold is set at 1.7 degrees/min. This threshold can vary depending on the type of plane, flight conditions, and flight profile. If the magnitude of del_pitch_filt is less than 1.7 degrees/min, the ADM_valid flag will be set to true, and AHC 14 will continue to operate in normal mode with air data being used in the leveling algorithms. If the magnitude of del_pitch_filt is greater than 1.7 degrees/min, the ADM_valid flag will be set to false, and AHC 14 will be operated in a basic mode.

If AHC 14 is operating in basic mode, it will continue monitoring the leveling parameters as long as the air data is valid and within range. If the leveling parameters become reasonable again, AHC 14 will return to normal mode operation. As shown in FIG. 2, the leveling parameters are regarded as reasonable when the magnitude of both leveling parameters is less than a second threshold, in this case, 0.6 degrees/minute. The value of the second threshold is determined by the values of the leveling parameters collected during normal flight operations. This second threshold (0.6 degrees/minute) is set so that the leveling parameter values during normal flight operations are just less than the threshold. The value of the second threshold may vary for different types of airplanes, flight conditions, and flight profiles.

EXAMPLES

With an understanding of how a method of preventing potentially hazardously misleading attitude data according to one embodiment functions, the application of the embodiment to some simulations will be discussed in this section. FIGS. 3–7 show graphs of simulations that were performed using an embodiment of a method of preventing potentially hazardously misleading attitude data according to the present invention. Tables 1 and 2 show results of simulations for various flight patterns. The simulations were performed using Xmath, available from Integrated Systems, Inc., which has a headquarters in Sunnyvale, Calif. The results achieved by the present invention can be seen through analysis of FIGS. 3–7 and Tables 1 and 2.

Two basic types of undetected TAS failure modes/flight maneuvers are considered in assessing the monitor's performance. All other combinations of TAS failure modes/flight maneuver are combinations of these two types.

A. TAS Ramp/Sawtooth Error During Straight/Level Flight

During a straight/level/constant speed flight, a ramping TAS error will cause the pitch axis to erect along one direction all the time. As a result, the computed local level reference is not aligned to the actual local level reference. The difference results in AHC 14 pitch error. The magnitude of the mis-erection rate is proportional to the magnitude of the erroneous ramping TAS input, up to the limited authority of 4.6 degrees/minute. In this case, the AHC 14 pitch attitude error caused by the ADC 12 leveling effect can be monitored by monitoring the history of the pitch leveling rate of the computed local level reference. If the resulting pitch attitude error can cause hazardously misleading attitude information, the monitor will detect the error and AHC 14 will cease using the ADC 12 data in its leveling algorithms.

The key monitor parameter used to monitor this type of TAS failure mode/flight maneuver is del_pitch_filt, the filtered mis-leveling rate along the pitch axis. This monitor parameter is the most sensitive one under this condition and its value directly relates to the induced pitch attitude error.

Figure 3:
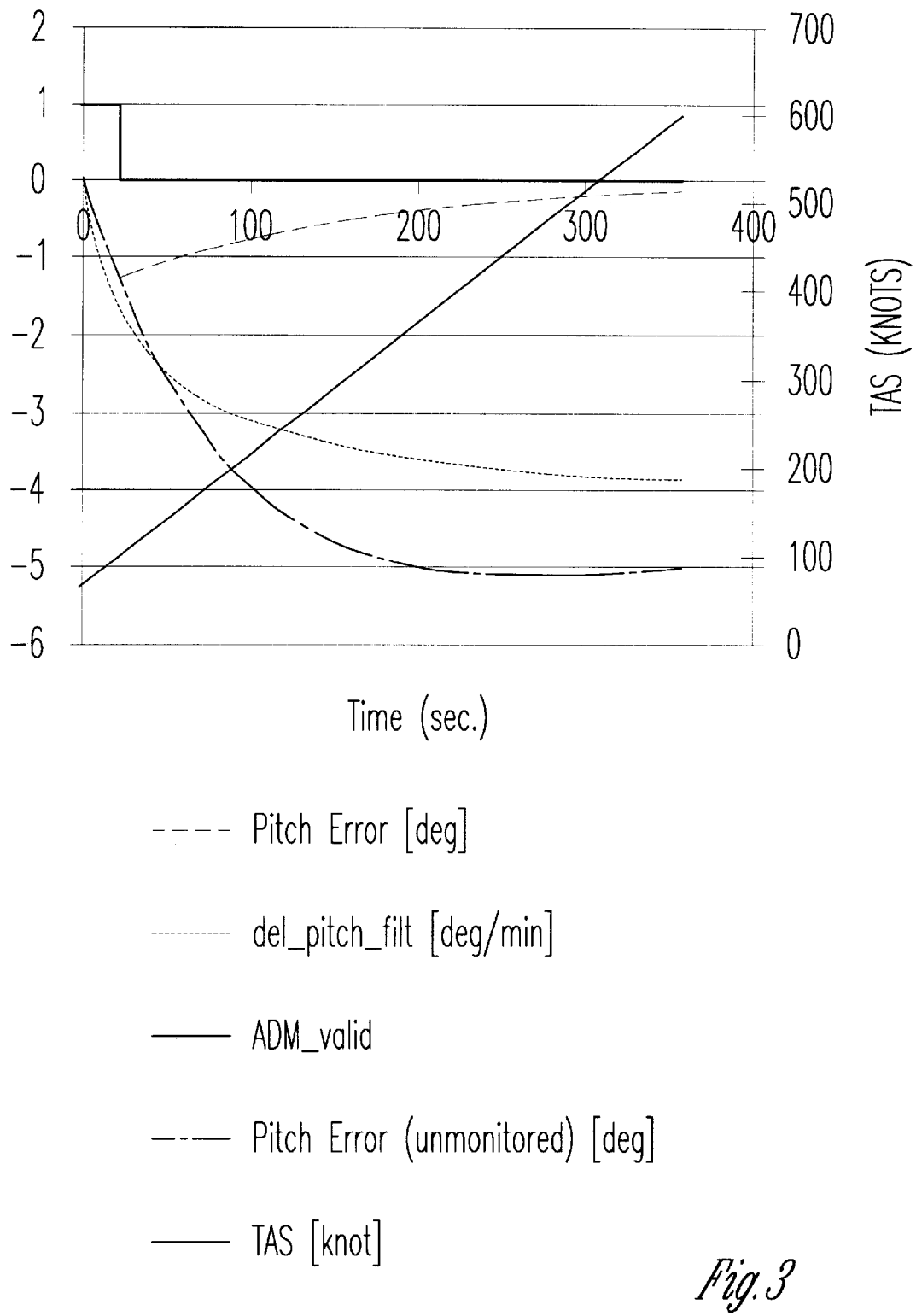
FIG. 3 is a graph of a simulation showing a response of a method of preventing potentially hazardously misleading attitude data according to an embodiment of the present invention to an erroneous true air speed ramp input during a straight flight profile.
Figure 4:
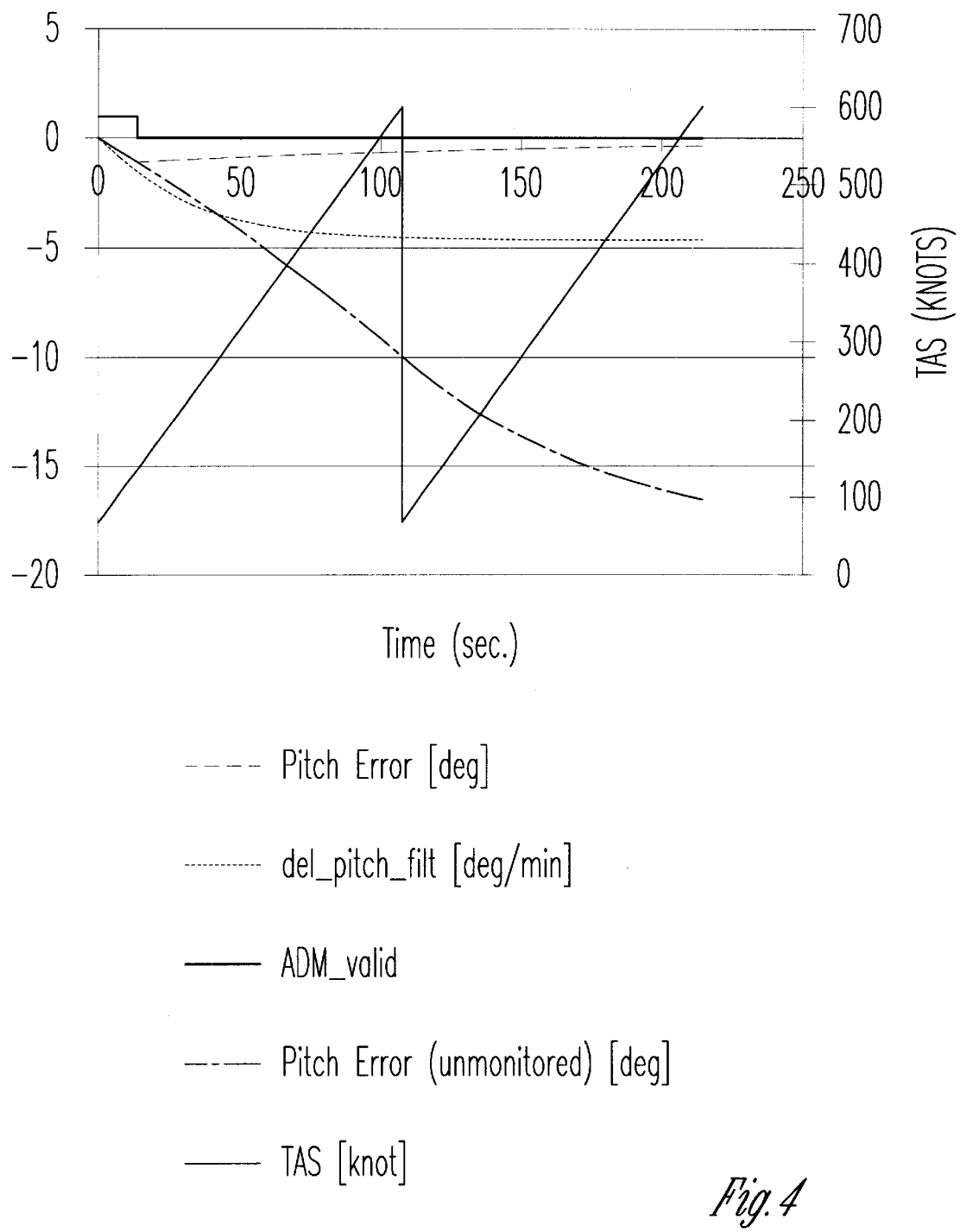
FIG. 4 is a graph of a simulation showing a response of a method of preventing potentially hazardously misleading attitude data according to an embodiment of the present invention to an erroneous true air speed saw-tooth input during a straight flight profile.
Figure 5:
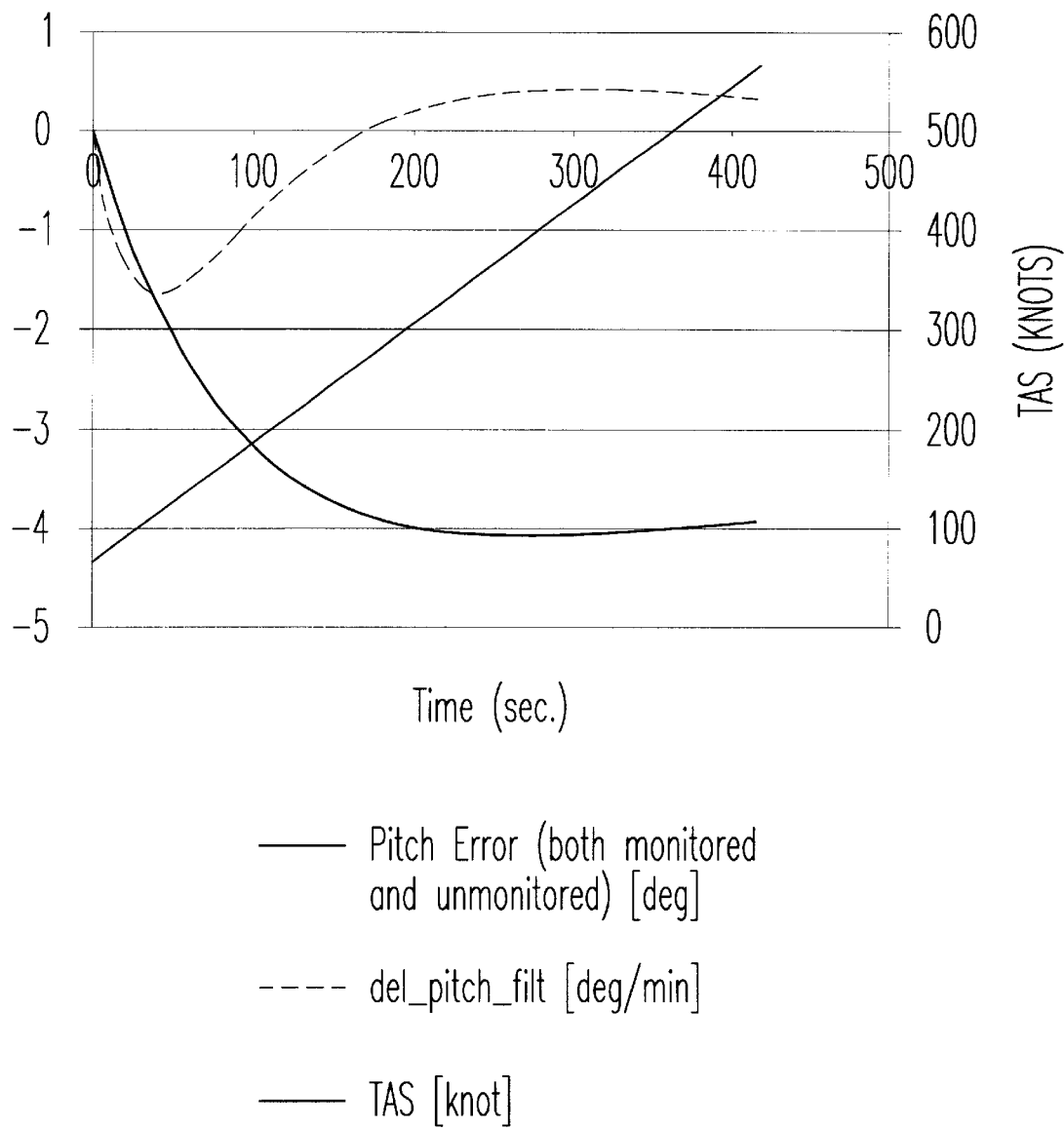
FIG. 5 is a graph of a simulation showing a response of a method of preventing potentially hazardously misleading attitude data according to an embodiment of the present invention to an erroneous true air speed ramp input during a straight flight profile.

The three examples shown in FIGS. 3–5 illustrate the mis-leveling effect described above and the corresponding monitor 16 response. The first example (FIG. 3) examines the effect of an erroneous ramping TAS of 1.5 knots/sec from 65 knots to 600 knots while the aircraft (a/c) is in straight/level/constant speed flight. This erroneous ramping TAS results in an along-heading acceleration error of 0.078G. (A stuck TAS value while the aircraft is decelerating at 1.5 knots/sec will have the same effect). As shown in FIG. 3, without the method of preventing potentially hazardously misleading attitude data, the pitch error will reach the hazardously misleading limit of 5 degrees at 200 seconds.

With the method of preventing potentially hazardously misleading attitude data enabled, the monitor parameter del_pitch_filt reaches its threshold, 1.7 deg/minute, at 22 seconds. At this instant, monitor 16 will set ADM_valid to false and direct AHC 14 to neglect air data input and perform the basic mode operation. The rate bias error induced by the erroneous TAS is 0.22 degrees/min, which can be easily corrected in the basic mode operation. As indicated in FIG. 3, with the monitor enabled, the pitch error reaches a peak of 1.24 degrees at detection point, and then gradually levels out. Therefore, in this example, the method of preventing potentially hazardously misleading attitude data effectively detects the probable HMI occurrence and gracefully reverts AHC 14 to a safe operation.

FIG. 4 shows a graph which examines the effect of an erroneous, repeating, ramping TAS of 5 knots/sec from 65 knots to 600 knots (saw-tooth ramp) while the a/c is in straight/level/constant speed flight. This erroneous ramping TAS results in an along-heading acceleration error of 0.26G. As shown in FIG. 4, without the method of preventing potentially hazardously misleading attitude data, the pitch error reaches the hazardously misleading limit of 5 degrees at 58 second and continues growing thereafter. At the end of the second TAS ramp, the pitch error reaches 16.5 degrees.

With the method of preventing potentially hazardously misleading attitude data enabled, the monitor parameter del_pitch_filt reaches its threshold, 1.7 deg/minute, at 14 seconds. At this instant, monitor 16 will set ADM_valid to false and direct AHC 14 to neglect air data input and perform the basic mode operation. As indicated in FIG. 4, with monitor 16 enabled, the pitch error reaches 1.1 degrees peak at detection point and then gradually diminishes. Therefore, in this example, the method of preventing potentially hazardously misleading attitude data effectively detects the probable HMI occurrence and gracefully reverts AHC 14 to basic mode operation to provide a safe result.

As noted before, the threshold values for the leveling parameters are chosen such that if an erroneous air data input would cause an attitude HMI, then the resulting monitoring parameters will exceed their threshold values. Comparing a leveling rate to a threshold value is one way of detecting a characteristic indicative of producing hazardously misleading attitude data. The air data induced leveling rates during normal operations preferably should not cause the leveling parameters to exceed their respective thresholds. In this design, the threshold setting (1.7 degree/minute) is much higher than the values (usually not exceeding 0.6 degree/minute) during normal flight operations. Therefore, the occurrence of false alarms should be rare.

FIG. 5 shows a graph which examines the effect caused by the maximum erroneous TAS ramp allowed without detection by the described embodiment of a method of preventing potentially hazardously misleading attitude data. Consider the erroneous ramping TAS of 1.2 knots/sec from 65 knots to 600 knots while the a/c is in straight/level/constant speed flight. This erroneous ramping TAS results in an along-heading acceleration error of 0.062G. As shown in FIG. 5, with or without the method of preventing potentially hazardously misleading attitude data, the pitch error will reach a maximum error of 4.1 degrees, which is less than the hazardously misleading limit of 5 degrees.

In the example of FIG. 5, the maximum value of the monitor parameter del_pitch_filt is just below its threshold, 1.7 deg/minute. Therefore, the method of preventing potentially hazardously misleading attitude data does not make a detection of the erroneous air data leveling effect. Since the maximum pitch error (4.1 degrees) does not exceed the HMI limit of 5 degrees, no-detection is an adequate monitor response. Therefore, this monitor threshold provides a minimum error budget of 0.9 degrees (compared with the HMI limit) if an erroneous air data leveling effect is not detected.

B. Simulation Table 1

The first five simulations shown in Table 1 below assume that the a/c is flying straight/level at a constant speed and the TAS input has various erroneous ramp magnitudes. The last four simulations assume the a/c is accelerating while subjected to various erroneous TAS ramp magnitudes. This is a sample of the various types of flight scenarios, and is not intended to be all inclusive.

TABLE 1

| Flight Profile | Erroneous TAS Pattern | W/O method of preventing potentially hazardously misleading attitude data | | With method of preventing f potentially hazardously misleading attitude data | |
|---|---|---|---|---|---|
| | | Time to reach 5 deg pitch error under the erroneous TAS pattern | Maximum Pitch Attitude error caused by erroneous TAS @ time | Monitor Detection | Pitch error (deg) when the erroneous air data leveling effect is detected @ time (sec) |
| 1. Straight/level @ constant speed | 65 to 600 knots @ 1.2 knots/sec | N/A | −4.1 @ 250 s | No | N/A |

TABLE 1-continued

| Flight Profile | Erroneous TAS Pattern | W/O method of preventing potentially hazardously misleading attitude data | | With method of preventing potentially hazardously misleading attitude data | |
|---|---|---|---|---|---|
| | | Time to reach 5 deg pitch error under the erroneous TAS pattern | Maximum Pitch Attitude error caused by erroneous TAS @ time | Monitor Detection | Pitch error (deg) when the erroneous air data leveling effect is detected @ time (sec) |
| 2. Straight/level @ constant speed | 65 to 600 knots @ 1.3 knots/sec | N/A | −4.4 @ 250 s | Yes | −1.5 @ 30 s |
| 3. Straight/level @ constant speed | 65 to 600 knots @ 1.5 knots/sec | 200 s | "5.1 @ 250 s | Yes | −1.24 @ 22 s |
| 4. Straight/level @ constant speed | 65 to 600 knots @ 1.667a knots/sec | 135 s | −5.7 @ 250 s | Yes | −1.2 @ 20 s |
| 5. Straight/level @ constant speed | 65 to 600 knots @ 5 knots/sec (repeat twice, saw-tooth pattern) | 58 s | −17 @ 200 s* | Yes | −1.1 @ 14 s |
| 6. Acc. 65 to 332 knots @ 1.667 knots/sec | 65 to 600 knots @ 3.334 knots/sec | 135 s | −5.7 @ 230 s | Yes | −1.2 @ 17 s |
| 7. Acc. 65 to 332 knots @ 0.8333 knots/sec | 65 to 600 knots @ 1.667 knots/sec | N/A | −2.8 @ 230 s | No | N/A |
| 8. Acc. 332 to 600 knots @ 1.667 knots/sec | 352 to 65 knots @ −1.667 knots/sec | 60 s | 10 @ 150 s | Yes | 1.1 @ 13 s |
| 9. Acc. 332 to 600 knots @ 0.8333 knots/sec | 352 to 65 knots @ −0.8333 knots/sec | 135 s | 5.7 @ 250 s | Yes | 1.2 @ 17 s |

Column 1 lists the simulated a/c flight profile. Column 2 lists the postulated TAS error pattern during the simulated flights. Columns 3 and 4 list the pitch attitude error caused by the postulated TAS error pattern when the method of preventing potentially hazardously misleading attitude data is not enabled. If the induced pitch attitude error reaches the HMI limit, the time when the pitch attitude error reaching the HMI limit is shown in Column 3. "N/A" entry in Column 3 means that the attitude error does not reach the HMI limit in this simulation case. Column 4 lists the maximum pitch attitude error and corresponding occurrence time for each postulated TAS error pattern. Columns 5 and Columns 6 show the response of the method of preventing potentially hazardously misleading attitude data and the pitch attitude error at the detection point, if there is detection.

As shown in the Table 1, for simulation cases 3, 4, 5, 6, 8, and 9, without the method of preventing an occurrence of potentially hazardously misleading attitude data, the erroneous air data induced pitch attitude error will exceed the HMI limit. In all these cases, with the method of preventing potentially hazardously misleading attitude data, detection is made in time, AHC 14 reverts to basic mode operation, and the resulting peak pitch attitude errors (all occur at the detection point) are reduced to much less than 5 degrees.

Simulation cases 1 and 2 of Table 1 show the resulting peak pitch attitude errors when the leveling parameter del_pitch_filt is just below and above the threshold value, respectively. In case 1, the maximum value of del_pitch_filt is just less than the threshold (1.7 deg/min) and the erroneous air data leveling effect is not detected. This case illustrates the maximum pitch attitude error that could be induced by erroneous air data leveling for this type of TAS error without monitor 16 detection. The magnitude of the resulting peak pitch error is 4.1 degrees. Therefore, monitor 16 provides an error margin of 0.9 degrees before reaching HMI limit. In case 2, the value of del_pitch_filt reaches its threshold at 30 seconds. As a result, monitor 16 will detect the fault and revert AHC 14 to basic mode operation. In this case, the maximum pitch attitude error is reduced from 4.4 degrees without the method of preventing potentially hazardously misleading attitude data, to 1.5 degrees with the method.

In simulation 7, the magnitude of the leveling parameter does not exceed the threshold and the maximum pitch error induced by the erroneous air data leveling is 2.8 degrees, which never reaches HMI magnitude. As a result, there is no detection by the monitor.

C. TAS Offset Error During Bank Turns

As previously described, during a coordinated turn the TAS is used to compute the long-term bank angle reference. TAS offset will result in an erroneous reference bank angle. The amagnitude of the error in bank angle reference is $\emptyset\_ref\_error = \tan^{-1}((TAS \times turn\ rate)/g) - \tan^{-1}(((TAS+offset) \times turn\ rate)/g)$.

AHC 14 will be gradually mis-erected to the erroneous bank reference, thereby introducing a roll error. The magnitude of the mis-erection rate is proportional to the bank reference error, up to a limited authority of 4.6 degrees/minute. Therefore, the AHC 14 roll attitude error caused by the air data leveling effect can be monitored by monitoring the history of the roll leveling rate. If the resulting roll attitude error will cause hazardously misleading attitude information, monitor 16 will make a detection and AHC 14 will cease using the ADC 12 data in its leveling algorithms.

The key leveling parameter used to monitor this type of TAS failure mode/flight maneuver is del_roll_filt, the filtered mis-leveling rate along the roll axis. This leveling parameter is the most sensitive one under this condition and its value directly relates to the induced roll attitude error when the turn is initiated. However, as the vehicle turns, the bank error and the pitch error will transfer between each other. The speed of the error transfer depends on the vehicle turn rate. When the vehicle turns slower, it takes longer time for roll error to transfer into pitch error and the mis-leveling effect along the roll-axis will last longer. When the vehicle turns faster, the roll error transfers to pitch error faster and the development of the mis-leveling effect along the roll-axis will be reduced and the resulting roll error is smaller than the mis-leveling induced roll error during a slower turn. Therefore, during turns, either leveling parameter may cause a monitor detection.

Figure 6:
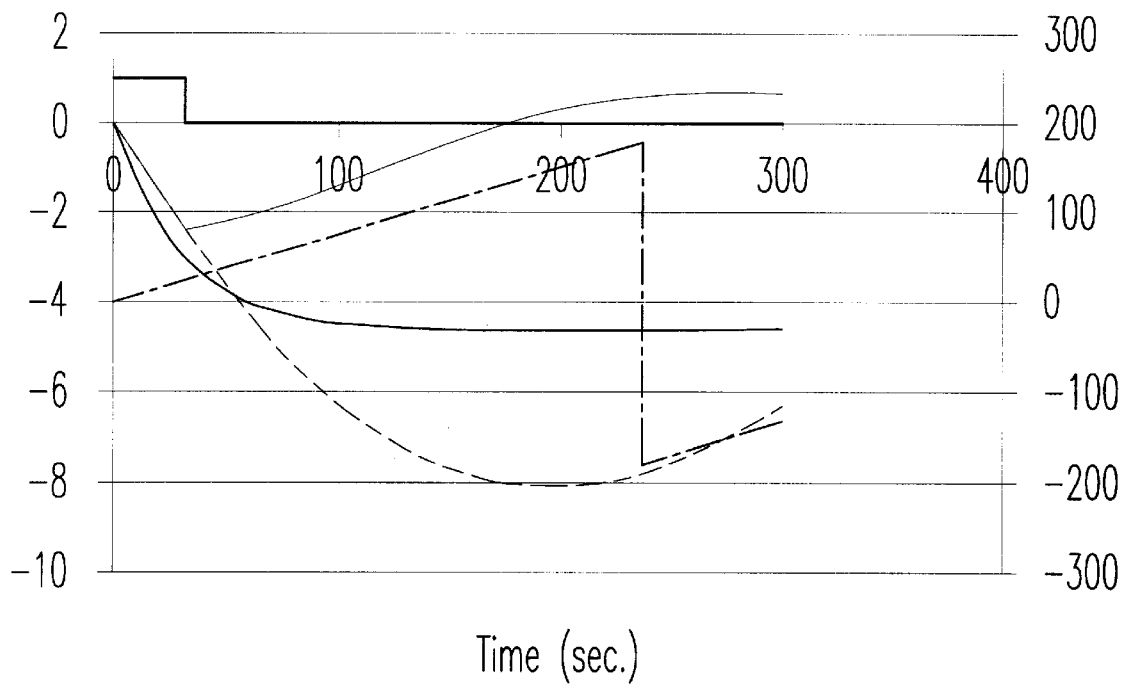
FIG. 6 is a graph of a simulation of a response of a method of preventing hazardously misleading attitude data according to an embodiment of the present invention to an error in true air speed during a banked turn.
Figure 7:
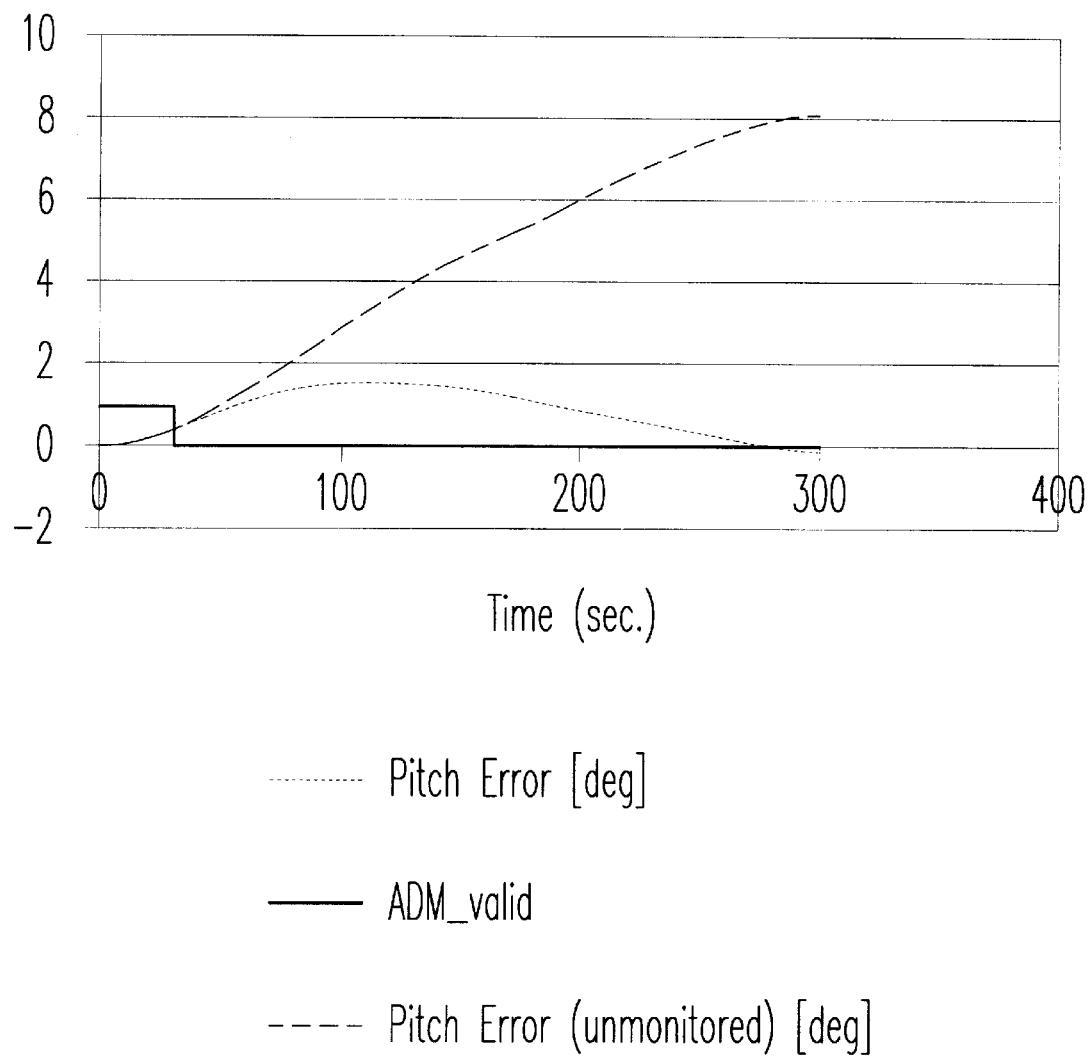
FIG. 7 is a graph of a simulation of a response of a method of preventing potentially hazardously misleading attitude data according to an embodiment of the present invention to erroneous true air speed input during a banked turn.

The following example illustrates the mis-leveling effect described above and the corresponding monitor response. This example examines the effect of an erroneous TAS offset during a coordinated turn. Consider an airplane with actual TAS of 600 knots and sensed TAS of 65 knots making a 22.5 degree bank angle coordinated turn. As shown in FIG. 6, without the method of preventing potentially hazardously misleading attitude data, the roll error reaches the hazardously misleading limit of 5 degrees at 65 seconds, then oscillates with a maximum amplitude of about 8 degrees. As described above, during a turn, the roll error transfers to pitch error. As shown in FIG. 7, pitch error also oscillates, with a maximum exceeding 8 degrees.

With the method of preventing potentially hazardously misleading attitude data enabled, the monitor parameter del_roll_filt reaches its threshold, 3 deg/minute, at 17 seconds. At this instant, monitor 16 will set ADM_valid to false and direct AHC 14 to neglect air data input and perform the basic mode operation. As indicated in FIG. 6, with monitor 16 enabled, the roll error reaches 2.3 degrees peak at detection point, and then gradually levels out with oscillation. As shown in FIG. 7, with the monitor 16 enabled, the pitch error oscillates with a maximum error of 1.5 degrees. Therefore, in this example, the method of preventing potentially hazardously misleading attitude data effectively detects the probable HMI occurrence and gracefully reverts AHC 14 to a safe operation.

D. Simulations of Table 2

The second group of simulations investigates the monitor characteristics under the postulated TAS magnitude error during turns. The simulations are run with combinations of various bank angles and TAS.

TABLE 2

| Flight Profile | Erroneous TAS Pattern | Time to reach 5 deg roll error under the erroneous TAS Pattern | W/O method of preventing potentially hazardously misleading attitude data | With method of preventing potentially hazardously misleading attitude data | |
|---|---|---|---|---|---|
| | | | Max. attitude error (deg) caused by the erroneous TAS @ time (sec) | Monitor Detection | Altitude error (deg) when the erroneous air data leveling effect is detected @ time (sec) |
| 1. 10 deg bank turn @ (wz = 0.32 deg/s) | 65 knots | 70 s | −9 roll @ 200 s | Yes | −2.4 roll @ 31 s |
| 2. 15 deg bank turn @ 600 knots | 65 knots | 65 s | −14 roll @ 600 s | Yes | −2.3 roll @ 31 s |
| 3. 22.5 deg bank turn @ 600 knots | 65 knots | 65 s | −8 roll @ 200 s | Yes | −2.3 roll @ 31 s |
| 4. 30 deg bank turn @ 600 knots | 65 knots | 95 s | −5.2 roll @ 120 s | Yes | −2.3 roll @ 31 s |
| 5. 45 deg bank turn @ 600 knots | 65 knots | N/A | −2.7 roll @ 60 s | Yes | −2 roll @ 31 s |

TABLE 2-continued

| | | W/O method of preventing potentially hazardously misleading attitude data | | With method of preventing potentially hazardously misleading attitude data | |
|---|---|---|---|---|---|
| Flight Profile | Erroneous TAS Pattern | Time to reach 5 deg roll error under the erroneous TAS Pattern | Max. attitude error (deg) caused by the erroneous TAS @ time (sec) | Monitor Detection | Altitude error (deg) when the erroneous air data leveling effect is detected @ time (sec) |
| 6. 15 deg bank @ 425 knots | 600 knots | N/A | 4.3 roll @ 120 s | No | N/A |
| 7. 15 deg bank @ 420 knots | 600 knots | N/A | 4.4 roll @ 120 s | Yes | 2.6 roll @ 37 s |
| 8. 15 deg bank turn @ 65 knots | 600 knots | N/A | −1.5 pitch @ 40 s | Yes | 0.8 roll, −1.3 pitch @ 31 s |

Column 1 lists the simulated a/c flight profile. Column 2 lists the postulated TAS error pattern during the simulated flights. Columns 3 and 4 list the attitude error caused by the postulated TAS error pattern when the method of preventing potentially hazardously misleading attitude data is not enabled. If the induced attitude error reaches the HMI limit, the time when the attitude error reaches the HMI limit is shown in Column 3. An "N/A" entry in Column 3 means that the attitude error does not reach the HMI limit in this simulation case. Column 4 lists the maximum attitude error and corresponding occurrence time for each postulated TAS error pattern. During a turn, the roll error and pitch error will transfer between each other. Therefore, in some maneuvers the maximum attitude error may occur in the pitch axis as indicated in the simulation case 8. Columns 5 and 6 show the response of the method of preventing potentially hazardously misleading attitude data and the attitude error at the monitor detection point if there is detection.

As shown in Table 2, for simulation cases 1, 2, 3 and 4, without the method of preventing potentially hazardously misleading attitude data the erroneous air data induced roll error will exceed the HMI limit. In all these cases, with the method of preventing potentially hazardously misleading attitude data detection is made in time and AHC 14 reverts to basic mode operation. As a result, the resulting maximum attitude errors (all occur at the detection point) are reduced to about 2.3 degrees.

Simulation cases 6 and 7 show the resulting maximum roll attitude error when the monitor parameter del_roll_filt is just below and above the threshold value, respectively. In case 6, the maximum value of del_roll_filt is just less than the threshold (3 deg/min) and the erroneous air data leveling effect is not detected by the monitor. This case illustrates the maximum attitude error that could be induced by an erroneous air data leveling for the considered error pattern, without monitor 16 detection. The magnitude of the resulting roll error is 4.3 degrees. Therefore, monitor 16 provides an error margin of 0.7 degrees before reaching the HMI limit. In case 7, the value of del_roll_filt reaches threshold at 37 seconds. As a result, the monitor detects the fault and revert AHC 14 to basic mode operation. In this case, the peak roll attitude error is reduced from 4.4 degrees without the method of preventing potentially hazardously misleading attitude data to 2.6 degrees with monitor 16.

Due to the phenomenon that roll error and pitch error transfer between each other during a turn, the correlation between the monitor parameter del_roll_filt and the roll error is not as close as the correlation between the monitor parameter del_pitch_filt and the pitch error during straight/level flight with TAS ramp error. This phenomenon is demonstrated in simulation cases 5 and 8. The results of these two cases indicate that the monitor may detect an erroneous TAS leveling effect and revert to basic mode operation even though the resulting attitude error does not result in an HMI limit. However, even though it is not necessary to raise the flag in both cases, the attitude performance with the monitor 16 is improved compared to the attitude performance without the monitor 16.

The same phenomenon (transfer between roll error and pitch error during a turn) also affects the peak magnitude of the mis-leveling induced attitude error. As shown in simulation cases 2, 3, and 4, without the method of preventing potentially hazardously misleading attitude data the maximum attitude error becomes smaller as the bank angle becomes larger which implies the a/c is turning faster. When the a/c turns slower, it takes a longer time for roll error to transfer into pitch error and the mis-leveling effect along the roll-axis will last longer. Otherwise, the mis-leveling effect along the roll-axis is not completely developed and the resulting roll error will transfer into pitch error, which is much smaller than the roll error caused by a completely developed mis-leveling effect.

Thus, a method of preventing potentially hazardously misleading attitude data is disclosed which possesses at least all of the stated objects. From the foregoing, it will be observed that numerous variations and modifications may be affected without departing from the spirit and scope of the novel concepts of the present invention. It will be understood that no limitation with respect to the specific embodiment illustrated herein is intended or should be inferred. The terms and expressions which have been employed herein are used as terms of description and not of limitation. There is no intent in the use of such terms and expressions to exclude any future equivalents of features shown and described herein, but it is recognized that various modifications are possible within the scope of invention now claimed.

I claim:

1. A method of preventing an occurrence of potentially hazardously misleading attitude data, comprising:

deriving pitch leveling rate and roll leveling rate from velocity data and inertial data;

monitoring the pitch and roll leveling rates for a characteristic indicative of producing hazardously misleading attitude data; and disregarding at least some velocity data if the characteristic is detected.

2. The method of claim 1 wherein monitoring the pitch and roll leveling rates comprises setting respective and thresholds for the pitch and roll leveling rates, and the characteristic is detected when either the pitch or roll leveling rate exceeds the respective threshold.

3. The method of claim 2 wherein at least some of the velocity data is disregarded in leveling algorithms.

4. The method of claim 3 wherein the pitch leveling rate and roll leveling rate are measured along their respective Euler axes.

5. The method of claim 3 wherein the pitch and roll leveling rates are derived by an attitude/heading computer.

6. A computer readable medium containing instructions for causing an attitude/heading computer to perform the steps of:

deriving a value of a leveling parameter from velocity data and inertial data;

monitoring the leveling parameter for a characteristic indicative of producing hazardously misleading attitude data; and disregarding at least some velocity data in leveling algorithms of the attitude/heading computer if the characteristic is detected.

7. The computer readable medium of claim 6 wherein the step of monitoring the leveling parameter comprises comparing the value of the leveling parameter to a threshold and the characteristic is detected when the leveling parameter exceeds the threshold value.

8. The computer readable medium of claim 7 wherein an attitude data has an error and the threshold value is set so that the leveling parameter will reach the threshold prior to the error reaching a hazardously misleading limit, so as to provide a safety margin.

9. The computer readable medium of claim 7 wherein the leveling parameter is a pitch leveling rate.

10. The computer readable medium of claim 7 wherein the leveling parameter is a roll leveling rate.

11. The computer readable medium of claim 7 wherein the velocity data is an output from a GPS receiver, input into the attitude/heading computer.

12. The computer readable medium of claim 7 wherein the velocity data is an output from a digital air data computer, input into the attitude/heading computer.

13. The computer readable medium of claim 7 wherein the velocity data is an output from an analog air data sensor, input into the attitude/heading computer.

14. The computer readable medium of claim 7 in combination with a computer, the computer having a memory and a processor.

15. A method of preventing potentially hazardously misleading attitude data related to a leveling parameter, comprising:

deriving a value of a leveling parameter from velocity data and inertial data;

monitoring the leveling parameter for a characteristic indicative of producing hazardously misleading attitude data;

disregarding at least some velocity data if the characteristic is detected.

16. The method of claim 15 wherein the step of monitoring the leveling parameter comprises comparing the value of the leveling parameter to a threshold value, and the characteristic is detected when the leveling parameter exceeds the threshold value.

17. The method of claim 16 wherein the leveling parameter is a pitch leveling rate.

18. The method of claim 17 wherein the pitch leveling rate is measured along an Euler axis.

19. The method of claim 16 wherein attitude data is in error, and the value of the threshold is such that if the leveling parameter reaches its threshold value, the value of the attitude error will be less than a value of a hazardously misleading attitude error, thereby providing a safety margin.

20. The method of claim 19 wherein the leveling parameter is a pitch leveling rate.

21. The method of claim 20 wherein the value of the hazardously misleading attitude error is five degrees or greater error in pitch attitude.

22. The method of claim 19 wherein the leveling parameter is a roll leveling rate.

23. The method of claim 22 wherein the value of the hazardously misleading attitude error is five degrees or greater error in roll attitude.

24. The method of claim 15 wherein the leveling parameter is a roll leveling rate.

25. The method of claim 24 wherein the roll leveling rate is measured along an Euler axis.

26. The method of claim 15 wherein the at least some velocity data is disregarded in leveling algorithms.

27. The method of claim 26 wherein all velocity data is disregarded in the leveling algorithms.

28. The method of claim 27, further comprising:

reverting to an operating mode wherein velocity data is considered in the leveling algorithms if the leveling parameter falls below a second threshold, wherein the second threshold is less than the first threshold for the leveling parameter.

29. The method of claim 15 wherein the velocity data and inertial data are input into an attitude/heading computer and the attitude/heading computer derives the attitude data.

30. The method of claim 29 wherein an air data computer outputs the velocity data into the attitude/heading computer, and the velocity data includes true airspeed and altitude rate of an airplane.

31. The method of claim 29 wherein an air data computer outputs the velocity data into the attitude/heading computer, and the velocity data includes indicated airspeed and pressure altitude of an airplane.

32. The method of claim 29 wherein a GPS receiver outputs the velocity data into the attitude/heading computer, and velocity data includes groundspeed and altitude rate of an airplane.

33. The method of claim 29 wherein an analog air data sensor outputs velocity data into the attitude/heading computer.

\* \* \* \* \*